(12) United States Patent
Bshara et al.

(10) Patent No.: US 10,404,674 B1
(45) Date of Patent: Sep. 3, 2019

(54) EFFICIENT MEMORY MANAGEMENT IN MULTI-TENANT VIRTUALIZED ENVIRONMENT

(71) Applicant: Amazon Technologies, Inc., Seattle, WA (US)

(72) Inventors: Nafea Bshara, San Jose, CA (US); Thomas A. Volpe, Austin, TX (US); Adi Habusha, Moshav Alonei Abba (IL); Yaniv Shapira, Bet Itzhak (IL)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 15/445,190

(22) Filed: Feb. 28, 2017

(51) Int. Cl.
*G06F 12/14* (2006.01)
*G06F 9/455* (2018.01)
*H04L 29/06* (2006.01)
*H04L 9/08* (2006.01)

(52) U.S. Cl.
CPC ........ *H04L 63/061* (2013.01); *G06F 9/45558* (2013.01); *H04L 9/0869* (2013.01); *G06F 12/1408* (2013.01); *G06F 2009/45583* (2013.01); *G06F 2009/45587* (2013.01)

(58) Field of Classification Search
CPC ....... G06F 9/45558; G06F 2009/45587; G06F 12/1408
See application file for complete search history.

(56) References Cited

U.S. PATENT DOCUMENTS

| | | | |
|---|---|---|---|
| 6,799,272 B1 * | 9/2004 | Urata | H04L 9/0866 713/169 |
| 9,323,552 B1 * | 4/2016 | Adogla | G06F 9/45558 |
| 9,798,482 B1 * | 10/2017 | Tsirkin | G06F 3/0623 |
| 2006/0107320 A1 | 5/2006 | Bhatt et al. | |
| 2009/0113217 A1 * | 4/2009 | Dolgunov | G06F 12/1408 713/190 |
| 2009/0282266 A1 * | 11/2009 | Fries | G06F 21/602 713/193 |
| 2010/0153749 A1 * | 6/2010 | Sakai | G06F 21/57 713/193 |
| 2010/0257331 A1 | 10/2010 | Frank | |
| 2011/0099387 A1 | 4/2011 | Gremaud et al. | |
| 2013/0205139 A1 | 8/2013 | Walrath | |
| 2013/0326117 A1 | 12/2013 | Aune | |

(Continued)

OTHER PUBLICATIONS

U.S. Appl. No. 15/280,897, filed Sep. 29, 2016, Titled: Securing Interfaces of a Compute Node.

(Continued)

*Primary Examiner* — Daniel B Potratz
(74) *Attorney, Agent, or Firm* — Kilpatrick Townsend & Stockton LLP

(57) ABSTRACT

Efficient memory management can be provided in a multi-tenant virtualized environment by encrypting data to be written in memory by a virtual machine using a cryptographic key specific to the virtual machine. Encrypting data associated with multiple virtual machines using a cryptographic key unique to each virtual machine can minimize exposure of the data stored in the memory shared by the multiple virtual machines. Thus, some embodiments can eliminate write cycles to the memory that are generally used to initialize the memory before a virtual machine can write data to the memory if the memory was used previously by another virtual machine.

22 Claims, 10 Drawing Sheets

(56) References Cited

U.S. PATENT DOCUMENTS

| | | |
|---|---|---|
| 2014/0298338 A1 | 10/2014 | Doi |
| 2015/0229471 A1 | 8/2015 | Nair et al. |
| 2015/0248357 A1* | 9/2015 | Kaplan ............... G06F 12/1408 713/193 |
| 2016/0094552 A1 | 3/2016 | Durham et al. |
| 2016/0274814 A1* | 9/2016 | Zhang ................ G06F 9/45558 |
| 2018/0095898 A1* | 4/2018 | Khosravi ............. G06F 21/445 |
| 2018/0150331 A1 | 5/2018 | Chen et al. |

OTHER PUBLICATIONS

U.S. Appl. No. 15/445,324, filed Feb. 28, 2017, Titled: Tracking Persistent Memory Usage.

U.S. Appl. No. 15/445,516, filed Feb. 28, 2017, Titled: Write Minimization for De-Allocated Memory.

\* cited by examiner

| VMID 402 | KEY CONFIGURATION 404 | CRYPTOGRAPHIC KEY 406 | ADDRESS SCRAMBLING FLAG 408 | ENCRYPTION FLAG 410 |
|---|---|---|---|---|
| 1 | RANDOM | KEY 1 | NO | YES |
| 2 | DERIVED | KEY 2 | YES | YES |
| 3 | DERIVED | KEY 3 | NO | NO |
| 4 | RANDOM | KEY 4 | NO | YES |
| . . . | | | . . . | . . . |
| N | RANDOM | KEY N | YES | YES |

CONTROLLER TABLE 306

FIG. 4

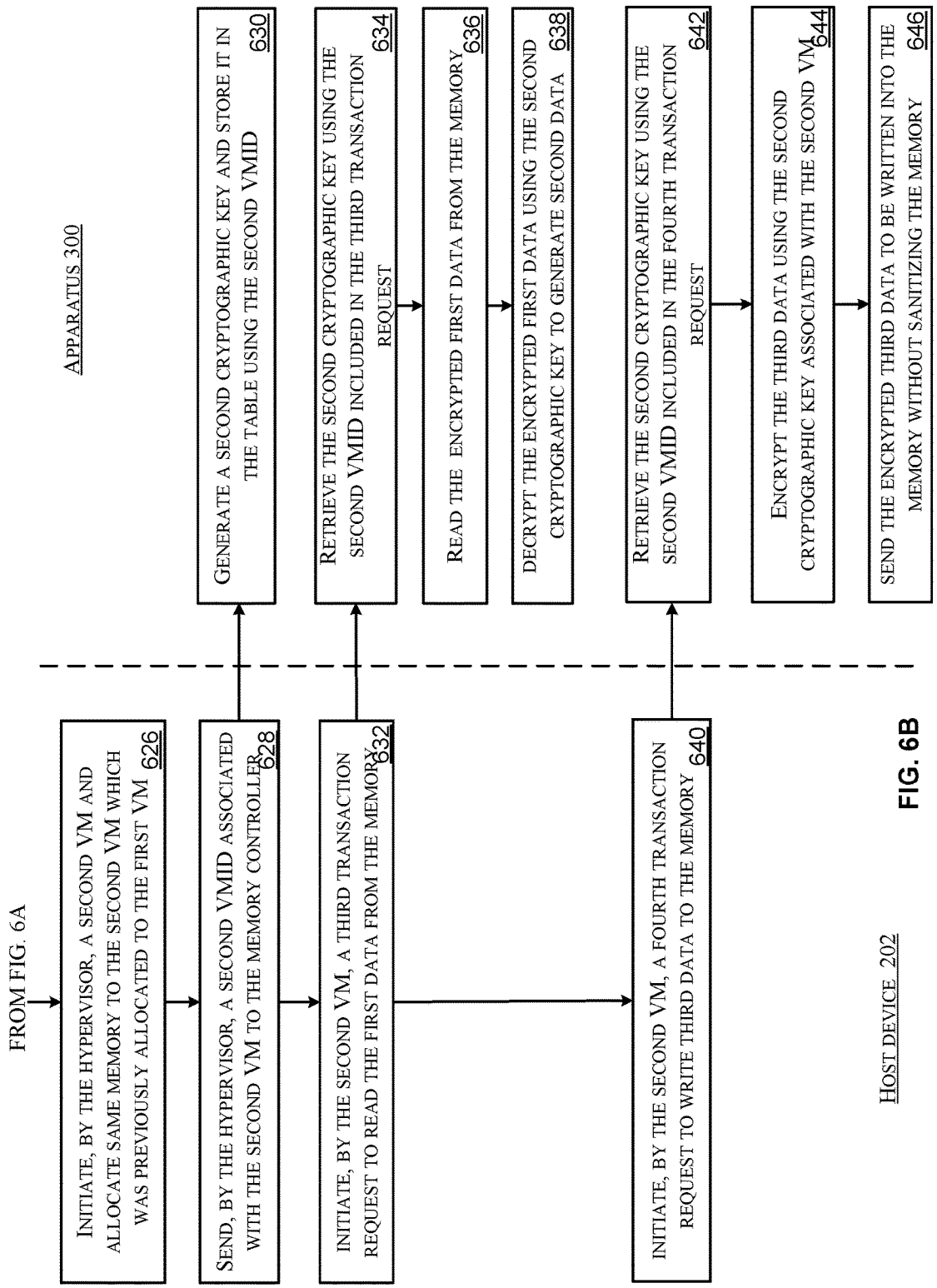

EFFICIENT MEMORY MANAGEMENT IN MULTI-TENANT VIRTUALIZED ENVIRONMENT

BACKGROUND

In a virtualized environment, multiple virtual machines (VMs) can be executed on a single host device. Each VM can be allocated a portion of memory which the VM can access to store data. In order to avoid exposing the data used by one VM to another VM, generally, the memory is initialized in between the VM usages. However, initialization of the memory can introduce additional writes to the memory. This can be particularly undesirable for storage class memories which have a limited write endurance, i.e., can only handle limited number of writes before becoming unreliable.

BRIEF DESCRIPTION OF THE DRAWINGS

Various embodiments in accordance with the present disclosure will be described with reference to the drawings, in which:

FIG. 4 illustrates a controller table that may be used to store cryptographic keys, in one embodiment of the disclosed technologies.

FIG. 6B describes a second flow diagram for communication between the hypervisor and the apparatus, according to some embodiments.

DETAILED DESCRIPTION

Figure 1:
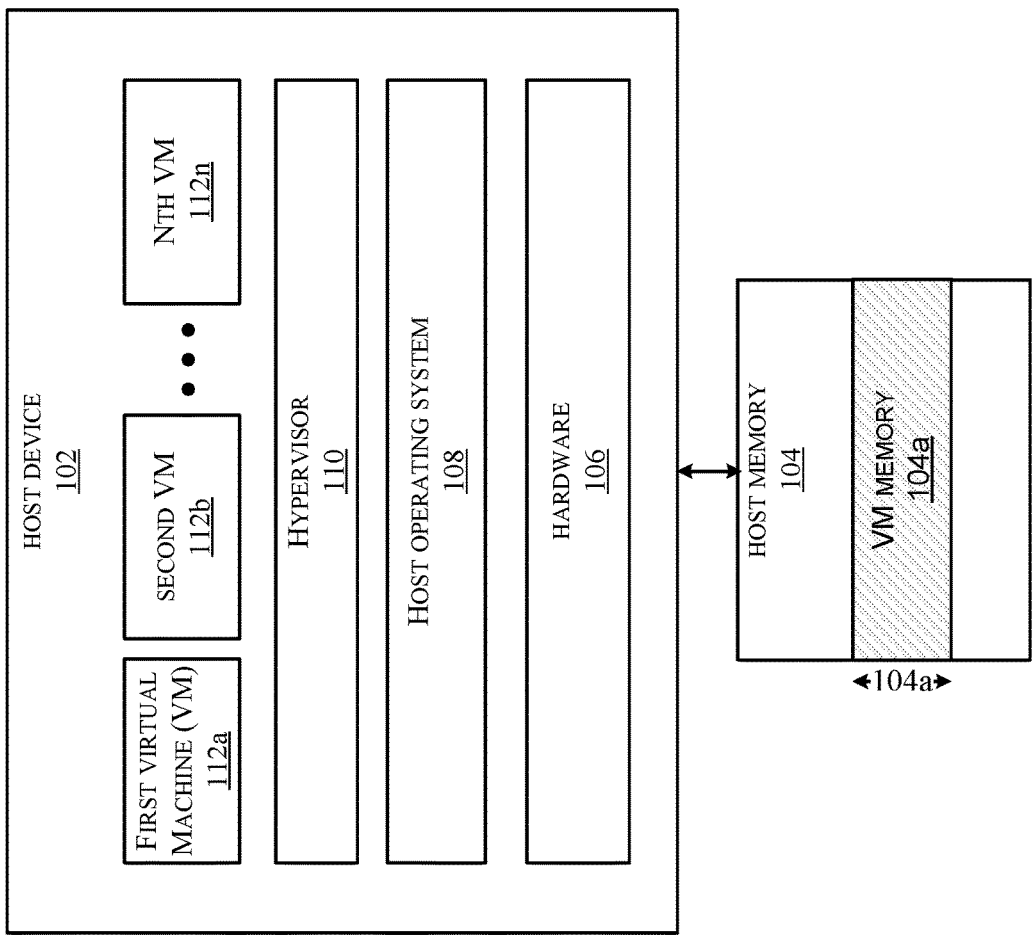
FIG. 1 illustrates a block diagram of a host device coupled to a host memory.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In cloud computing, multiple tenants or customers can run their respective applications in a virtualized environment on the same hardware. For example, each application can be in the form of a virtual machine (VM) executing from a single host device. Generally, a hypervisor or a virtual machine manager (VMM) may be used to manage the virtual machines on the host device and execute at a higher privilege level than the VMs. Each VM may be allocated a portion of memory in a host memory before a VM can start executing on the host device. For example, the host memory can include dynamic random access memory (DRAM), storage class memory (SCM) or any other suitable memory communicatively coupled to the host device. Typically, the hypervisor may initialize the assigned portion of the memory for the VM at or right after initiating the VM, before that VM starts executing and/or after that VM is migrated, terminated or has been inactive for an extended period of time so that the same portion of memory can be reused for the other VM without exposing data associated with a particular VM to another. This initialization of the memory in between the VM usages may be called sanitization or scrubbing of the memory. For example, in some instances, the memory portion assigned to the VM can be scrubbed or sanitized before the VM starts executing by initializing the assigned memory portion with random or predetermined patterns, all zeros, or all ones, in order to obscure the previously stored data.

Initialization of the assigned memory in between the VM usages can introduce unnecessary writes to the host memory which can otherwise be used for writing customer data. This problem is further exacerbated for non-volatile memory, such as storage class memories due to their inherent characteristic of limited write endurance. Thus, in most instances, number of writes that can be performed to a host memory in a multi-tenant virtualized environment can become critical.

Various embodiments of the disclosed technologies can eliminate initialization of the memory shared by a plurality of VMs in between VM usages for sanitization purposes. According to some embodiments, data to be stored in the memory for each VM from a plurality of VMs executing on a host device can be encrypted using a cryptographic key specific to a respective VM. For example, in some embodiments, the data associated with each VM can be encrypted by a memory controller communicatively coupled to the memory. Encrypting the data, using a specific cryptographic key associated with a VM, to be written in the memory associated with a physical address space shared by the plurality of VMs can make the data meaningless for other VMs that may use that same physical address space at a later point in time. Thus, extra write cycles to initialize that memory by the hypervisor after a first VM stops executing or before a second VM starts executing can be eliminated. In addition, having encrypted data in the memory using VM specific cryptographic keys can minimize exposure of the data to one another among the VMs. Further, encrypting the data at rest (i.e., data persistently stored in the memory), which may include sensitive (e.g., private) information for different customers, may provide an additional layer of security to the customers, in an event an unauthorized entity gets access to the host device or to the memory device. In some embodiments, an address where the encrypted data may be stored in the memory for each VM can be a scrambled address.

In some embodiments, the cryptographic key associated with each VM can be stored in a table in the memory controller. The table may be indexed by a virtual machine identifier (VMID) associated with respective VM. For example, the VMID can be provided by the hypervisor to the memory controller when the VM is created. In one embodiment, the cryptographic key for each VM can be generated by the memory controller using a random number generator, and can be stored in the table using the VMID as an index. The memory controller can retrieve the appropriate cryptographic key from the table using the VMID of the VM requesting a write or read transaction with the memory. In another embodiment, the cryptographic key may be derived from a remote key provided by a remote device via a network interface. For example, the remote key may be specific to a client, a server or a platform.

FIG. 1 illustrates a block diagram 100 of a host device 102 communicatively coupled to a host memory 104. The host device 102 may include a computer, e.g., a server computer.

In some implementations, the host device 102 may include a host operating system 108 executing on hardware 106. For example, the hardware 106 may include processors, memories, controllers, or any suitable components. A hypervisor 110 may be configured to execute on the host operating system 108, and to manage a plurality of virtual machines on the host device 102, e.g., a first virtual machine (VM) 112a, a second VM 112b, or an $N^{th}$ VM 112n. For example, N may be a positive integer, e.g., 10, 200, etc.

The hypervisor 110, also called a virtual machine manager (VMM), can emulate a single device as multiple virtual devices in a virtualized environment. The hypervisor 110 can also manage the flow of information between software, the virtualized hardware, and the physical hardware. The hypervisor 110 may be configured to create, start, monitor, stop or to delete each of the VMs 112a-112n, and may execute at a higher privilege level than the VMs 112a-112n. In some implementations, the hypervisor 110 can manage access controls, resources, scheduling, isolation, etc., for the VMs 112a-112n executing their respective guest operating systems (not shown). The hypervisor 110 may be implemented as a software layer or as code embedded in a firmware on the host device 102. Even though the hypervisor 110 is shown in FIG. 1 as the type 2 hypervisor (e.g., hosted hypervisor), it will be understood that the hypervisor 110 may also be implemented as a type 1 hypervisor (e.g., bare metal hypervisor), or any other suitable implementation.

Each of the VMs 112a-112n may be any suitable emulation of a computer system that may be managed by the hypervisor 110. Each of the VMs 112a-112n can run an independent operating system and an application on the hardware 106. For example, in some instances, the VMs 112a-112n may perform a write transaction to store data in the host memory 104, or a read transaction to read data stored in the host memory 104. Two or more VMs from the VMs 112a-112n may execute simultaneously or in any order on the host device 102. For example, in some instances, the second VM 112b may be initiated before the first VM 112a.

The host memory 104 may include dynamic random access memory (DRAM), synchronous DRAM (SDRAM), storage class memory (SCM), or any other suitable memory. The SCM may also be called persistent memory since it can retain its contents in the absence of power. In some implementations, the SCM may include a NAND flash and can be accessed using a memory bus. The SCM can provide benefits of high performance memories such as a DRAM and cost effectiveness of hard disc drives. However, SCMs have limited write endurance, e.g., SCMs can only handle a limited number of write cycles before wearing out or becoming unusable. In some implementations, a number of write cycles that can be performed on an SCM before the SCM becomes unusable or unreliable may be called "write endurance".

Generally, before a VM from the VMs 112a-112n starts executing, the hypervisor 110 may allocate a certain portion of the host memory 104, e.g., VM memory 104a, to that VM. As an example, the hypervisor 110 may allocate the VM memory 104a to the first VM 112a when the first VM 112a is created or before the first VM 112a starts executing. The VM memory 104a may correspond to a physical address space 104a from an address space assigned to the host memory 104. When the first VM 112a is terminated, migrated, or has been inactive for an extended period of time, the VM memory 104a used by the first VM 112a may be assigned to another VM, e.g., the second VM 112b. In one instance, when the second VM 112b is created, or right after the second VM 112b is initiated, or before the second VM 112b starts executing, the hypervisor 110 may allocate the VM memory 104a to the second VM 112b. However, since the VM memory 104a was previously used by the first VM 112a, the VM memory 104a may still store the data associated with the first VM 112a. Typically, the hypervisor 110 may initialize the VM memory 104a to sanitize the VM memory 104a before it can be used by the second VM 112b. For example, the hypervisor 110 may initialize the VM memory 104a with random patterns, all zeros or all ones to obscure the previously stored data associated with the first VM 112a. In some implementations, the hypervisor 110 may initialize the VM memory 104a after the first VM 112a has migrated, terminated or has been inactive for an extended period of time so that the VM memory 104a can be used by the other VMs without exposing the data associated with the first VM 112a. For example, different VMs may store data comprising sensitive information for different customers and hence exposure of the customer data among different VMs may not be desirable. Thus, initialization of the VM memory 104a in between the VM usages may result in extra write cycles to the host memory 104. When the host memory 104 is implemented as an SCM which has limited write endurance, these extra cycles to initialize the VM memory 104a can be highly undesirable and may otherwise be used to write customer data.

Figure 2:
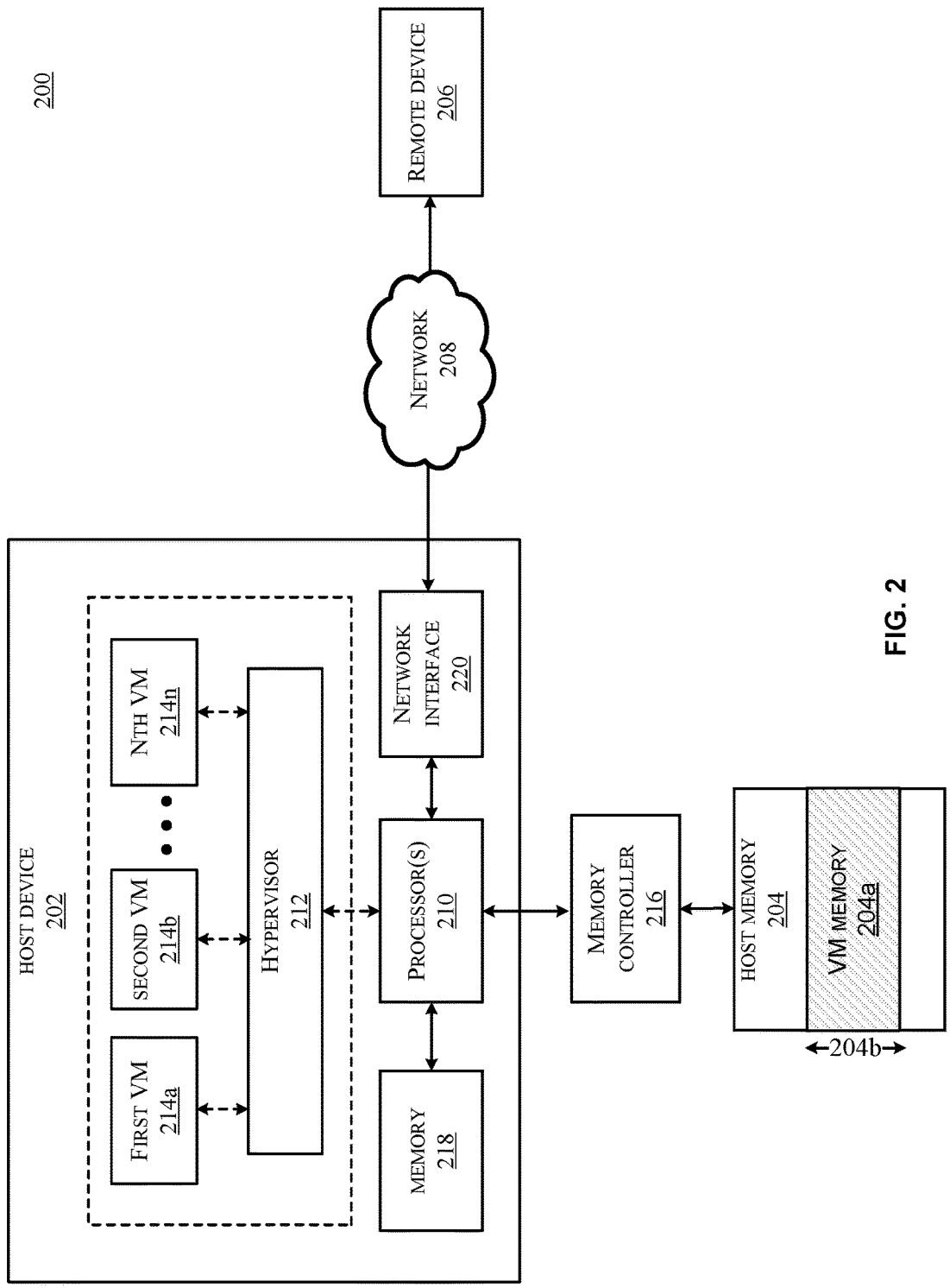
FIG. 2 illustrates a block diagram of a host device communicatively coupled to a host memory and to a remote device, in one embodiment of the disclosed technologies.

FIG. 2 illustrates a block diagram 200 of a host device 202 communicatively coupled to a remote device 206 via a network 208, and to a memory controller 216, in some embodiments of the disclosed technologies. The host device 202 may include a computer, e.g., a server computer. The memory controller 216 may be coupled to a host memory 204.

In some implementations, the host device 202 may include one or more processors 210 which may be communicatively coupled to a memory 218 and a network interface 220. In some embodiments, different components of the host device 202 may be connected using suitable interconnects, buses, fabrics, etc. A hypervisor 212 may be configured to execute on the processor(s) 210 in a virtualized environment. As discussed previously with reference to FIG. 1, the hypervisor 212 may be hosted on an operating system (not shown) running on the processor(s) 210 or may execute directly on the processor(s) 210.

The hypervisor 212 may be configured to manage a plurality of virtual machines, a first VM 214a, a second VM 214b, . . . , and an Nth VM 214n. The VMs 214a-214n may be similar to the VMs 112a-112n as discussed with reference to FIG. 1. The hypervisor 212 can also manage the flow of information between software, the virtualized hardware, and the physical hardware (e.g., the processors 210, memory controller 216, memory 218, network interface 220, and any other physical hardware). The hypervisor 212 may be configured to create, start, monitor, stop or to delete each of the VMs 214a-214n. In some implementations, the hypervisor 212 can manage access controls, resources, scheduling, isolation, etc., for the VMs 214a-214n executing their respective guest operating systems (not shown). In some embodiments, the hypervisor 212 can allocate memory to a VM when the VM is created or before the VM starts executing. In some embodiments, the hypervisor 212 may instruct the memory controller 216 to generate a cryptographic key specific to the VM when the VM is created and can provide a virtual machine identifier (VMID) associated with the VM to the memory controller 216. For example, in some implementations, the hypervisor 212 may write to a register in the memory controller 216 to initiate the generation of the cryptographic key. In some embodiments, a VMID may be assigned to a VM when the VM is created and can be reused after that VM is terminated. The hypervisor 212 may assign the VMIDs arbitrarily as the VMs are created such that each active VM has a unique VMID. The memory controller 216 may generate the cryptographic key specific to the VM and can use the VMID as an index to store the cryptographic key in a table. The hypervisor 212 can also provide the VMID in a transaction request to write data to the host memory 204 or to read data from the host memory 204.

The host memory 204 may be similar to the host memory 104 as discussed with reference to FIG. 1. For example, the host memory 204 may include DRAM, SDRAM, SCM, or any other suitable memory. In some implementations, VM memory 204a may include a portion of the host memory 204 that may be allocated to one or more VMs from the VMs 214a-214n. For example, the hypervisor 212 can allocate the VM memory 204a to a VM corresponding to a physical address space 204b in the host memory 204. For example, the VM memory 204a may be allocated to the VM by the hypervisor 212 when the VM is created or before the VM starts executing. The VM memory 204a may be accessed using an address from the physical address space 204b.

The memory controller 216 may provide an interface between the processor(s) 210 and the host memory 204 for transactions with the host memory 204. For example, the memory controller 216 may be configured to provide data, an address for the data, and controls to the host memory 204 for a write transaction. Similarly, the memory controller 216 may be configured to provide address and controls to the host memory 204 for a read transaction. In some implementations, the memory controller 216 may also be configured to receive data read from the host memory 204 for the read transaction. In some implementations, the memory controller 216 may be on the host device 202. In some other implementations, the memory controller 216 may be integrated with the host memory 204.

In some embodiments, the memory controller 216 may receive a VMID for a VM with an instruction from the hypervisor 212 to generate a cryptographic key for the VM. The memory controller 216 may be configured to generate and store cryptographic keys associated with different VMs in a table. The memory controller 216 may use the VMID for each VM as an index to the table to store a cryptographic key for the respective VM. In some embodiments, the cryptographic keys may be locally stored on the memory controller 216 and may not be accessible to the processors 210. According to some embodiments, the cryptographic key for each of the respective VMs is unique to the VM so that the encrypted data for one VM may not be decipherable by another VM. In one embodiment, a cryptographic key associated with a VM may be generated by the memory controller 216 using a random number generator. In another embodiment, the cryptographic key may be derived using a combination of a randomly generated key and a remote key received from the remote device 206 over the network 208.

In one instance, the VM may start executing and may initiate a transaction request to write data to the host memory 204. In some embodiments, the transaction request may include data, an address for the data to be written (e.g., a write address), and the VMID for the VM initiating the transaction request. For example, the write address may correspond to the physical address space 204b associated with the VM memory 204a allocated to the VM by the hypervisor 212. The memory controller 216 may use the VMID to retrieve the cryptographic key associated with the VM stored in the table to encrypt the data to be written. For example, the memory controller 216 may use the VMID for the VM as an index to retrieve the cryptographic key for encryption.

In some instances, a VM may initiate a transaction request to read data from the host memory 204. The transaction request may include an address to read the data from (e.g., a read address), and a VIVID for the VM requesting the transaction. The memory controller 216 may send the read address to the host memory 204 to read the data and may receive the data read from the host memory 204. In some instances, the data may include encrypted data stored previously by a VM. For example, the encrypted data may have been written by the same VM (i.e., current VM) requesting the read transaction or by another VM previously using the same physical address space as used by the current VM before getting terminated. The memory controller 216 may retrieve the cryptographic key for the VM using the VMID from the read transaction request. The memory controller 216 may attempt to decrypt the encrypted data read from the host memory 204 using the cryptographic key. If the write and read transactions were initiated by the same VM, the memory controller 216 may be able to decrypt the data read from the host memory 204 using the cryptographic key for that VM. If the write and read transactions were initiated by different VMs, the write transaction request and the read transaction request may include different VMIDs, and hence the cryptographic keys retrieved from the table using the different VMIDs may not match. Therefore, the memory controller 216 may only be able to decrypt the encrypted data if the decryption is performed using the same cryptographic key as used for the encryption. Thus, the encrypted data read by the memory controller 216 may be of no significant value to the VM requesting the read transaction if the data is not decipherable. Thus, some embodiments can allow the hypervisor 212 to allocate the same memory to different VMs over time as the VMs are created and terminated without overwriting the memory in between the VM usages.

In some embodiments, the memory controller 216 may modify the address using a scrambling function. For example, the address may be from the physical address space 204b allocated to the VM when the VM was initiated. In some embodiments, address bits may be scrambled using a one-to-one mapping between the address bits used for addressing the memory and its corresponding scrambled address within a page associated with the VM.

The memory 218 may include volatile or non-volatile memory. In some embodiments, the memory 218 may include non-transitory computer readable medium. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may be executed by the processors 210. For example, the instructions stored in the memory 218 may include instructions associated with the hypervisor 212. In some embodiments, the memory 218 may also include one or more configuration registers. In some implementations, the memory 218 may be used to store a remote key provided by the remote device 206 over the network 208.

The network interface 220 may include any suitable interface to enable the host device 202 to communicate with the remote device 206 via the network 208. In some embodiments, the network 208 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc. As an example, in one implementation, the network interface 220 may include a physical Ethernet port.

The remote device 206 may include a server computer that can provide services to different clients such as cloud computing, cloud storage, data processing and warehousing, archive, analytics, web services, databases, applications, deployment services, website hosting, etc. In some embodiments, the remote device 206 may provide a remote key for encryption of data associated with all the VMs (i.e., applications) running on the host device 202. For example, the remote key may be a platform key or a server key. In some embodiments, the remote key may be associated with a specific client. The remote key may be provided to the host device 202 via the network interface 220 over the network 208. In some embodiments, the remote key may be stored in the memory 218 on the host device 202 and can be provisioned to the memory controller 216 to be used in the encryption of data for all the VMs associated with the specific client, server or platform.

Figure 3:
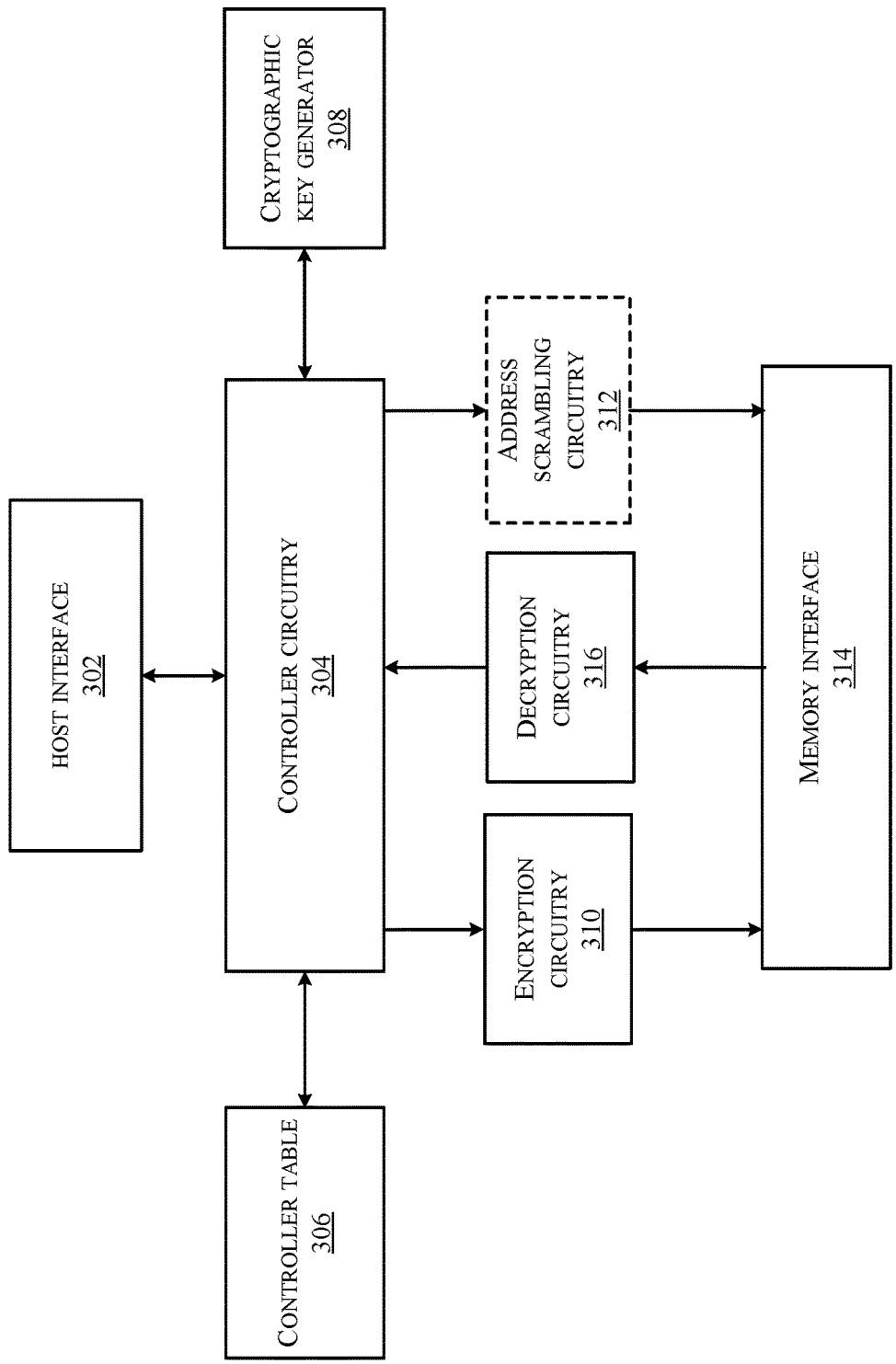
FIG. 3 illustrates an apparatus that may be part of a memory controller, in one embodiment of the disclosed technologies.

FIG. 3 describes an apparatus 300 which can be part of a memory controller, according to some embodiments. In some implementations, the apparatus 300 may include a host interface 302, controller circuitry 304, a controller table 306, a cryptographic key generator 308, encryption circuitry 310, address scrambling circuitry 312, decryption circuitry 316 and, a memory interface 314. In some embodiments, the apparatus 300 may be part of the memory controller 216 as described with reference to FIG. 2. The memory controller 216 may include additional components, e.g., arbiter(s), buffers, etc. It will be understood that in different implementations, the memory controller 216 may be implemented using various hardware components, software components, programmable logic, etc. For example, in some embodiments, the memory controller 216 may be implemented as an application specific integrated circuit (ASIC), a field programmable gate array (FPGA), or any suitable circuit.

The host interface 302 may provide a communication interface with the host device 202, e.g., the processors 210 or the hypervisor 212. For example, in one instance, the host interface 302 may receive a VMID associated with a VM from the hypervisor 212 for generating a cryptographic key for the VM. In some embodiments, the host interface 302 may be configured to receive a transaction request by a VM to access a memory communicatively coupled to the apparatus 300. For example, the transaction request may be for a write transaction or a read transaction with the host memory 204, as discussed with reference to FIG. 2. The transaction request may be initiated by any of the VMs 214a-214n, e.g., the first VM 214a, executing on the host device 202. The transaction request for a write access to the host memory 204 may include data, an address for the data, and a VMID associated with the VM. The transaction request for a read access to the host memory 204 may include an address to read the data from, and a VMID associated with the VM. For example, the address may be from the physical address space 204b corresponding to the VM memory 204a allocated to the first VM 214a by the hypervisor 212.

The cryptographic key generator 308 may be configured to manage generation of a respective cryptographic key associated with each VM from the plurality of VMs, e.g., VMs 214a-214n. For example, the cryptographic key generator 308 may be configured to manage generation of a first cryptographic key for the first VM 214a, a second cryptographic key for the second VM 214b, . . . , and an Nth cryptographic key for the Nth VM 214n. Each of the first cryptographic key, second cryptographic key, . . . , and the Nth cryptographic key may be different from each other. In some implementations, a cryptographic key may be generated for a VM after receiving a VMID for the VM from the hypervisor 212. In some embodiments, the cryptographic key generator 308 may generate the cryptographic key using a random number generator or using a remote key in combination with the random number generator based on a key configuration. For example, the key configuration may be provided by the hypervisor with the VMID. In some implementations, the cryptographic key may be generated by concatenating a randomly generated key with the remote key, or by performing an XOR function between the randomly generated key and the remote key. The random number generator may include a cryptographically secure pseudo-random number generator, cryptographic pseudo-random number generator, or any suitable random number generator.

The controller table 306 may be configured to store the cryptographic key associated with each VM using a respective VMID as an index. In some implementations, the controller table 306 may be used to store a key configuration 404, a cryptographic key 406, an address scrambling flag 408, and an optional encryption flag 410, corresponding to each VMID 402. For example, the controller circuitry 304 may receive the VMID 402 from the hypervisor 212 for generating a cryptographic key 406 for a VM. Based on the key configuration 404 corresponding to the VMID 402, the controller circuitry 304 may store a random key or a derived key generated by the cryptographic key generator 308. For example, the derived key may be derived by concatenating a randomly generated key with the remote key, by using an XOR function between a randomly generated key and the remote key, or using any suitable method. As an example, as shown in the controller table 306, for the VMID 402 equal to "1", based on the key configuration 404 equal to "random", a random key generated by the random number generator 308 may be stored as "key 1". Similarly, for the VMID 402 equal to "2", based on the key configuration 404 equal to "derived", a key derived from the remote key may be stored as "key 2". In some implementations, the VMID 402 equal to "1" may be associated with the first VM 214a, the VMID 402 equal to "2" may be associated with the second VM 214b, . . . , and the VMID 402 equal to "N" may be associated with the Nth VM 214n. It will be understood that the key configuration 404 may be implemented as a binary flag (e.g., "0" for random, and "1" for derived) or using any suitable method. In some embodiments, the cryptographic key 406 associated with each of the respective VMs 214*a*-214*n* may be unique to the VM, e.g., each of the key 1, key 2, key 3, ..., key N, may be different from each other.

The address scrambling flag 408 corresponding to each VMID 402 may be used to determine if an address for a transaction initiated by a VM associated with the VMID 402 has to be scrambled. For example, a "yes" for the address scrambling flag 408 corresponding to a particular VMID 402 may indicate that the address for a VM may need to be scrambled, and a "no" for the address scrambling flag 408 may indicate that the address may not be scrambled.

In some embodiments, the encryption flag 410 for the VMID 402 may be used to indicate whether encryption has to be performed on data associated with a particular VMID. For example, the encryption flag 410 may be configured by the hypervisor 212 during initialization of the respective VM. For example, a "yes" for the encryption flag 410 corresponding to a particular VMID 402 may indicate that the encryption may need to be performed, and a "no" for the encryption flag 410 may indicate that the encryption may not be performed. In some embodiments, the encryption flag 410 may be used to determine if data read from the host memory 204 for a read transaction initiated by a VM may need to be decrypted. For example, if the data for a write transaction previously initiated by that VM was encrypted before writing to the host memory 204 (e.g., the encryption flag 410 indicates "yes"), the data may need to be decrypted after reading from the host memory 204 using the same cryptographic key 406 for that VM.

Referring back to FIG. 3, the controller circuitry 304 may be configured to provide controls to different components of the apparatus 300. For example, the controller circuitry 304 may communicate with the cryptographic key generator 308 to generate a cryptographic key for a VMID received from the hypervisor 212 via the host interface 302. The controller circuitry 304 may further communicate with the controller table 306 to store the cryptographic key using the VMID as an index. The controller circuitry 304 may also retrieve a cryptographic key stored in the controller table 306 using the VMID received with a transaction request initiated by a VM to write to the host memory 204 or read from the host memory 204. The controller circuitry 304 may provide the data along with the cryptographic key to the encryption circuitry 310 for encrypting the data before writing the data into the host memory 204 for a write transaction. In some instances, the controller circuitry 304 may provide the data read from the host memory 204 to the host interface 302 to be communicated to the host device 202 for a read transaction. For example, the data may have been decrypted by the decryption circuitry 316.

The encryption circuitry 310 may be configured to encrypt the data for a write transaction with the host memory 204 initiated by a VM using a cryptographic key associated with the VM. For example, the cryptographic key may be retrieved from the controller table 306 using the VMID associated with the VM received in the transaction request. In the embodiments, the cryptographic key associated with each VM from the plurality of VMs may be unique for the respective VM. For example, the write transaction may be initiated by the first VM 214*a* and the cryptographic key may be "key 1" that may have generated randomly as discussed with reference to the controller table 306. According to the embodiments, the "key 1" may not be same as any other key used for encryption of the data associated with the other VMs for writing to the same physical address space. It will be understood that any suitable encryption algorithm may be used to encrypt the data using the cryptographic key, e.g., triple data encryption standard (triple DES), advanced encryption standard (AES), etc. In some embodiments, the encryption circuitry 310 may not encrypt the data for a VM based on the encryption flag 410 corresponding to the VMID associated with the VM.

The decryption circuitry 316 may be configured to decrypt the data read from the host memory 204 for a read transaction initiated by a VM. The decryption circuitry 316 may use the cryptographic key associated with the VMID received in the transaction request. For example, the cryptographic key may be retrieved from the controller table 306 using the VMID. In some embodiments, the decryption circuitry 316 may decrypt the data read from the host memory 204 only if the encryption flag 410 corresponding to that VMID indicates that the data stored at the read address includes encrypted data, e.g., the encryption flag 410 indicates "yes." In some instances, the data stored at the read address may not be encrypted, e.g., the encryption flag 410 indicates "no." In these instances, the decryption circuitry 316 may forward the data read from the host memory 204 to the controller circuitry 304 without performing any decryption. In some embodiments, the decryption circuitry 316 may provide gibberish or garbage data as a result of decryption. For example, if the data read from the host memory 204 includes data that was encrypted using a cryptographic key which was different than the key used for decrypting the data, e.g., if the write and read transactions were initiated by different VMs with different VMIDs, data produced by the decryption circuitry 316 may be meaningless to the VM requesting the read transaction and hence may include garbage data. Therefore, according to some embodiments, a read transaction performed by a VM to an address in the host memory 204 may return garbage data if a write to that address was not performed by the same VM previously. Thus, a VM cannot misuse the encrypted data written by another VM since it may not have visibility to the real content of the encrypted data. Hence, in certain embodiments, sanitization of the host memory 204 between allocations to different VMs can be eliminated. In some embodiments, based on the address scrambling flag 408, the address for the read transaction may or, may not be scrambled using the same scrambling function as used for writing the data.

The address scrambling circuitry 312 may be configured to scramble or modify, using a scrambling function, an address associated with a write or a read transaction with the host memory 204. The transaction request may be initiated by a VM from the VMs 214*a*-214*n*. The address may correspond to a location in a physical address space corresponding to the memory allocated to that VM. In some embodiments, the scrambling function may be used to scramble the address by generating a hash of the address. The address scrambling circuitry 312 can perform a one-to-one mapping in order to avoid hashing to the same address by two VMs. In some embodiments, upper bits of the address can be scrambled specific to a particular platform and lower bits of the address can be scrambled specific to a VM. In some embodiments, modifying the address using the scrambling function may include a one-to-one mapping. For example, the one-to-one mapping may include mapping between the address used for addressing the memory and its corresponding modified address. The address used for addressing the memory and its corresponding modified address can be within a page of the respective VM. For example, address bits used for addressing the memory within a page of the VM can be scrambled. As an example, for a 4K page of a VM, which can be accessed using address bits [11:0], and where read and write transactions are done on a 64 byte cache line basis, the address bits [11:6] can be scrambled using a one-to-one mapping. For example, the one-to-one mapping may include swapping different address bits [11:6] using a random seed, e.g., swapping an address bit [10] with an address bit [8], swapping even address bits with odd address bits, etc. In some implementations, scrambling of the address for a transaction initiated by a VM may be optional, and may or may not be performed based on the address scrambling flag 408 associated with the corresponding VMID in the controller table 306.

The memory interface 314 may be configured to communicate with the host memory 204 for a write or a read transaction initiated by a VM with the host memory 204. For example, the memory interface 314 may provide the encrypted data, and an address for the encrypted data, for writing the encrypted data at a location corresponding to the address from the physical address space corresponding to the portion of the memory allocated to the VM. The encrypted data for the write transaction may be received from the encryption circuitry 310. If the address scrambling flag 408 associated with the VMID for the VM is set to yes, the encrypted data may be written at a location corresponding to a scrambled address provided by the address scrambling circuitry 312. In the embodiments, encrypting the data associated with a VM that shares the same physical address space with another VM can eliminate extra writes to sanitize the memory in between the VM usages, and can minimize exposure of the data between customers. In some instances, the memory interface 314 may provide the address to the host memory 204 for a read transaction and may receive the data read from the host memory 204. For example, the data may be read from a location corresponding to the address from the physical address space corresponding to the portion of the memory allocated to the VM. The address may or may not be scrambled based on the address scrambling flag 408. Similarly, the data read from the host memory 204 may or may not be encrypted based on the encryption flag 410. It will be understood that the memory interface 314 may include any suitable components to interface with the host memory 204, e.g., memory buses, buffers, arbiters, etc.

Figure 5A:
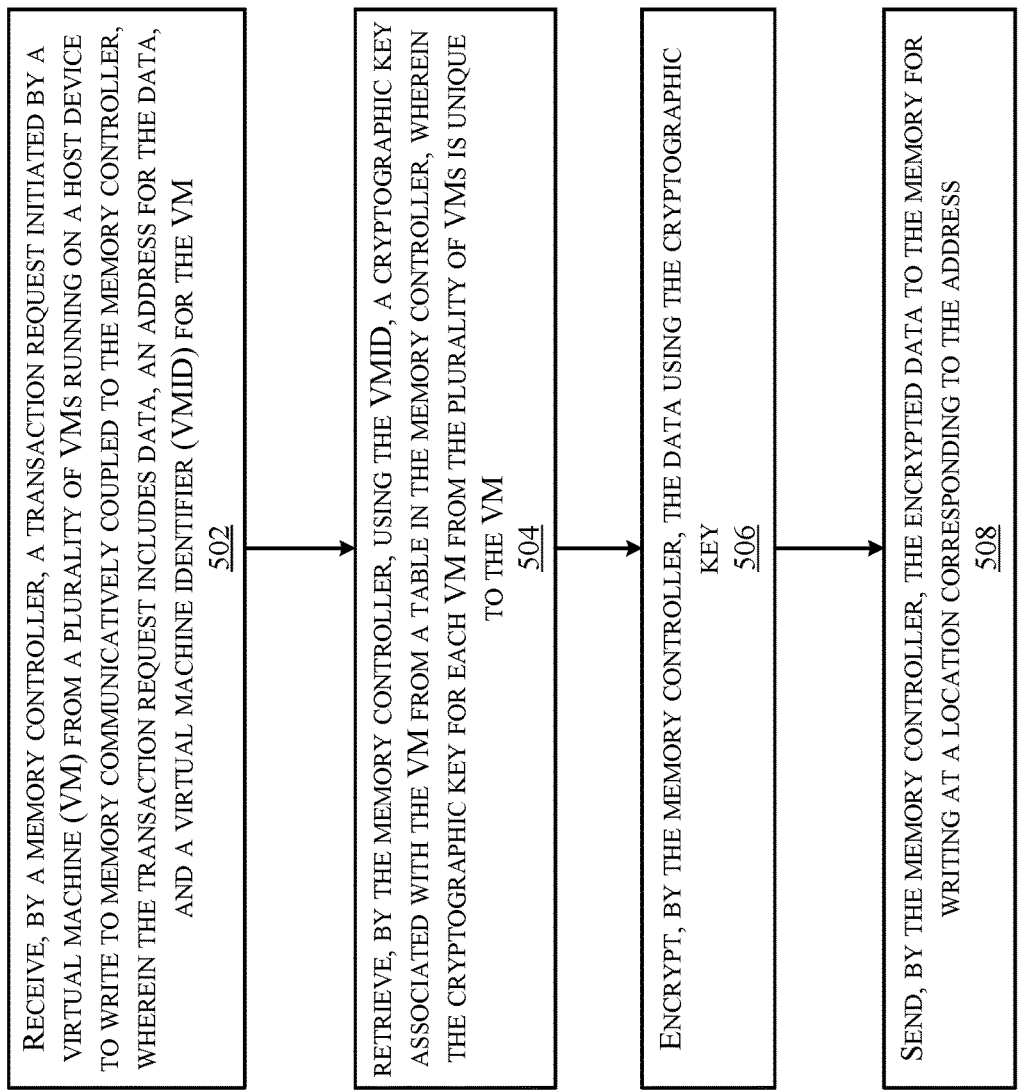
FIG. 5A illustrates a process flow executed by a memory controller for a write transaction, in one embodiment of the disclosed technologies.

FIG. 5A describes a flow diagram 500A for a method performed by the memory controller 216 for a write transaction with the memory, according to some embodiments.

In step 502, the memory controller 216 may receive a transaction request initiated by a VM from the plurality of VMs running on a host device to write to memory communicatively coupled to the memory controller 216. Referring back to FIG. 3, the memory controller 216 may receive a transaction request initiated by the first VM 214a from the plurality of VMs 214a-214n running on the host device 202 communicatively coupled to the host memory 204. The transaction request may include data, an address for the data, and a VMID for the VM. For example, the address for the data may correspond to an address from the physical address space 204b corresponding to the VM memory 204a. In some embodiments, the VM memory 204a may be allocated to the first VM 214a by the hypervisor 212 when the first VM 214a was created. As discussed with reference to FIG. 3, the transaction request may be received via the host interface 302.

In step 504, the memory controller 216 may retrieve, using the VMID, a cryptographic key associated with the VM from a table in the memory controller 216, wherein the cryptographic key for each VM from the plurality of VMs is unique to the VM. Referring back to FIG. 3, the cryptographic key may be retrieved from the controller table 306 using the VMID as an index to the controller table 306. In some embodiments, prior to receiving the transaction request, the cryptographic key for the VM may be generated by the memory controller 216 and stored in the controller table 306 using the VMID as the index. For example, the VMID may be provided by the hypervisor 212 in an instruction to the memory controller 216 to generate the cryptographic key when the VM is created or right after the VM is created.

In step 506, the memory controller 216 may encrypt the data using the cryptographic key. Referring back to FIG. 3, the encryption circuitry 310 may encrypt the data using a cryptographic key associated with the first VM 214a. For example, the cryptographic key 406 corresponding to the VMID 402 for the first VM 214a may be "key 1" as shown in the controller table 306 in FIG. 4. In the embodiments, encrypting the data associated with each VM using a cryptographic key specific to the VM can make the data undecipherable by the other VMs. In some embodiments, based on the encryption flag 410, the data may or may not be encrypted by the memory controller 216.

In step 508, the memory controller 216 may send the encrypted data to the memory for writing at a location corresponding to the address. Referring back to FIG. 2, the memory controller 216 may send the encrypted data to the host memory 204 via the memory interface 314 for writing at a location corresponding to the address from the physical address space 204b. In some instances, the VM memory 204a may have been allocated previously to the second VM 214b by the hypervisor 212 before the first VM 214a was initiated. Embodiments of the disclosed technologies can allow writing to the VM memory 204a without sanitizing the VM memory 204a between VM usages, e.g., after the second VM 214b was done executing, was migrated, was inactive for an extended period of time, or before the first VM 214a was initiated. This would eliminate extra write cycles associated with the sanitization to the host memory 204. In some embodiments, the address used for writing the encrypted data may be scrambled using the address scrambling circuitry 312, as discussed with reference to FIG. 3.

Figure 5B:
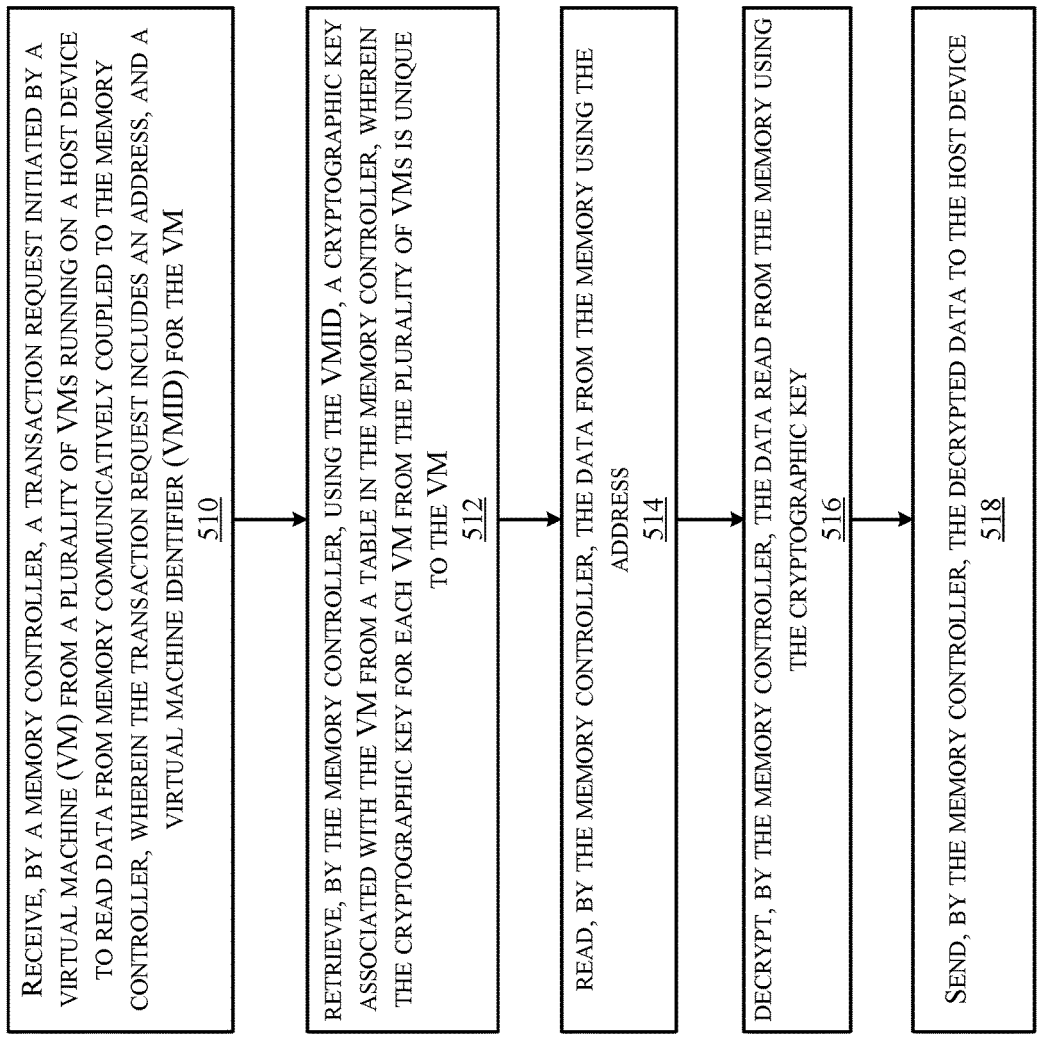
FIG. 5B illustrates a process flow executed by a memory controller for a read transaction, in one embodiment of the disclosed technologies.

FIG. 5B describes a flow diagram 500B for a method performed by the memory controller 216 for a read transaction with the memory, according to some embodiments. In some instances, the method illustrated using the flow diagram 500B may be performed after the method illustrated using the flow diagram 500A, as discussed with reference to FIG. 5A.

In step 510, the memory controller 216 may receive a transaction request initiated by a VM from the plurality of VMs running on a host device to read data from memory communicatively coupled to the memory controller 216. Referring back to FIG. 3, the memory controller 216 may receive a transaction request initiated by any of the VMs 214a-214n running on the host device 202. The transaction request may include an address, and a VMID for the VM. For example, the address for the data may correspond to an address from the physical address space 204b corresponding to the VM memory 204a. In some embodiments, the VM memory 204a may be allocated to the VM by the hypervisor 212 when the VM was created. As discussed with reference to FIG. 3, the transaction request may be received via the host interface 302.

In step 512, the memory controller 216 may retrieve, using the VMID, a cryptographic key associated with the VM from a table in the memory controller 216, wherein the cryptographic key for each VM from the plurality of VMs is unique to the VM. Referring back to FIG. 3, the cryptographic key may be retrieved from the controller table 306 using the VMID as an index to the controller table 306. In some embodiments, prior to receiving the transaction request, the cryptographic key for the VM may be generated by the memory controller 216 and stored in the controller table 306 using the VMID as the index. For example, the VMID may be provided by the hypervisor 212 in an instruction to the memory controller 216 to generate the cryptographic key when the VM is created or right after the VM is created.

In step 514, the memory controller 216 may read the data from the memory using the address. Referring back to FIG. 3, the data may be read from the VM memory 204a using the memory interface 314. The address to read the data may or may not be scrambled by the address scrambling circuitry 312 based on the address scrambling flag 408. In some instances, the data read from the VM memory 204a may include encrypted data. For example, the data may have been written by the same VM or by another VM using the cryptographic key associated with that VM.

In step 516, the memory controller 216 may decrypt the data read from the memory using the cryptographic key. Referring back to FIG. 3, the data may be decrypted by the decryption circuitry 316 using the cryptographic key retrieved in the step 512. In some instances, if the data read from the VM memory 204a was written by the same VM (e.g., the first VM 214a) initiating the read transaction, decryption may be performed using the cryptographic key retrieved in the step 512. However, if the data read from the VM memory 204a was written by a different VM (e.g., the second VM 214b) than the VM initiating the read transaction (e.g., the first VM 214a), the cryptographic key retrieved in the step 512 may not be able to decipher the data read from the VM memory 204a which was encrypted using a different cryptographic key. In some embodiments, based on the encryption flag 410, the data read from the memory may not include encrypted data and thus no decryption may be performed by the decryption circuitry 316.

In step 518, the memory controller 216 may send the decrypted data to the host device 202. Referring back to FIG. 3, the memory controller 216 may send the decrypted data to the host device 202 via the host interface 302. In some instances, the decrypted data may include garbage data if the cryptographic key used for decryption was different than the cryptographic key used for encryption of the data.

Figure 6A:
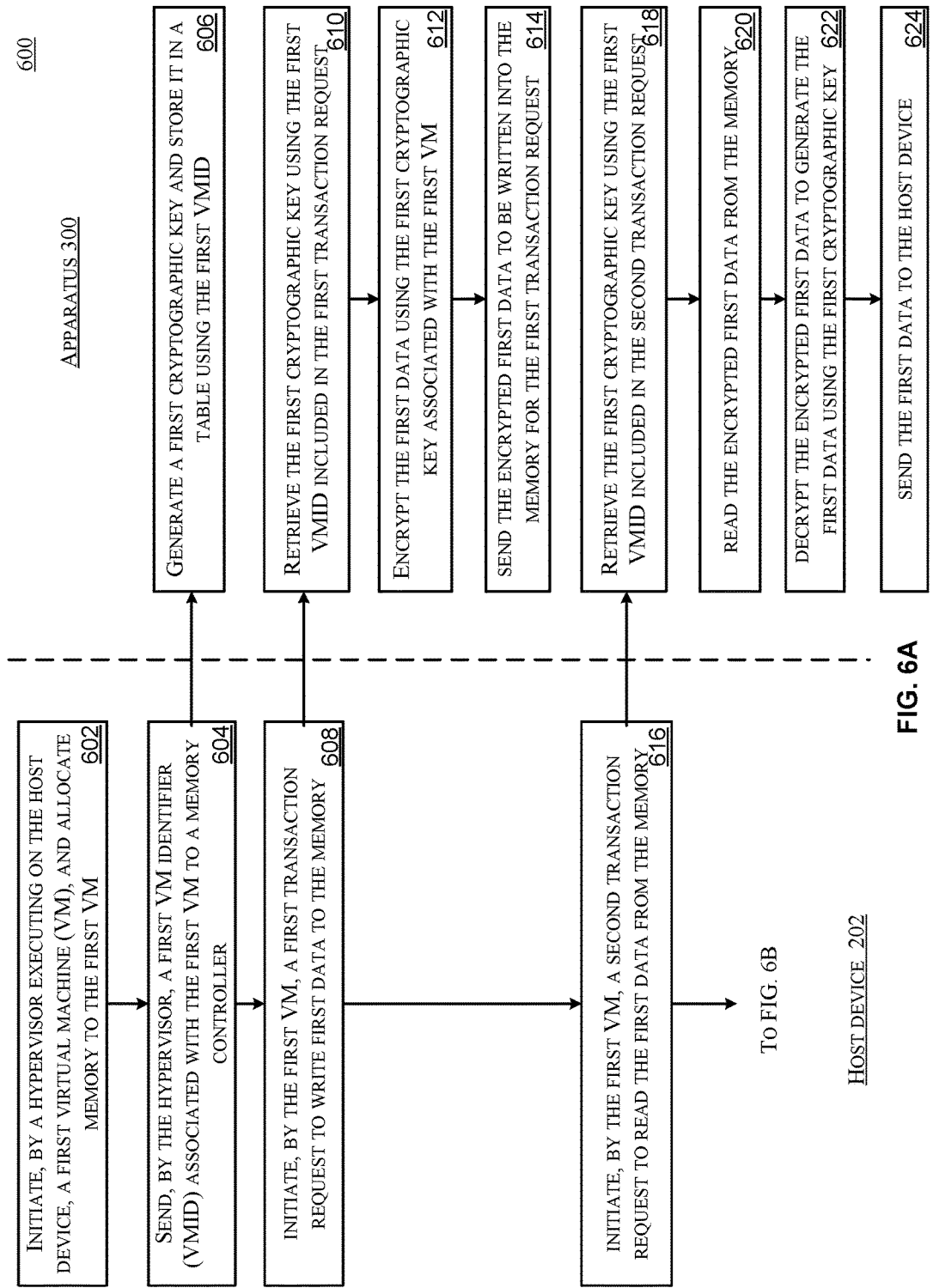
FIG. 6A describes a first flow diagram for communication between a hypervisor and the apparatus, according to some embodiments.

FIG. 6A describes a flow diagram 600 for communication between the host device 202 and the apparatus 300, according to some embodiments. The apparatus 300 may be part of the memory controller 216 as discussed with reference to FIG. 2 and FIG. 3.

In step 602, the hypervisor 212 executing on the host device 202 may initiate a first VM and allocate memory to the first VM. Referring back to FIG. 2, the hypervisor 212 may initiate the first VM 214a and allocate the VM memory 204a to the first VM 214a. The VM memory 204a may be accessible using an address from the physical address space 204b corresponding to the VM memory 204a.

In step 604, the hypervisor 212 may send a first VMID associated with the first VM to the memory controller 216. For example, the hypervisor 212 may send the VMID 402 equal to "1" associated with the first VM 214a to the apparatus 300.

In step 606, the apparatus 300 may generate a first cryptographic key and store it in a table using the first VMID. Referring back to FIG. 3, the controller circuitry 304 may receive the VMID associated with the first VM 214a via the host interface 302. The cryptographic key generator 308 may generate the first cryptographic key for the first VM 214a. As discussed with reference to FIGS. 3 and 4, based on the key configuration 404 equal to "random" in the controller table 306 for the VMID 402 equal to "1", the cryptographic key generator 308 may generate the first cryptographic key using a random number generator and store it as "key 1" corresponding to the VMID 402 equal to "1".

In step 608, the first VM may initiate a first transaction request to write first data to the memory. For example, the first VM 214a may initiate the first transaction request to write the first data to the VM memory 204a. The first transaction request may include the first data, an address for the first data from the physical address space 204b corresponding to the VM memory 204a, and the corresponding VMID 402. The first transaction request may be sent by the host device 202 to the memory controller 216.

In step 610, the apparatus 300 may retrieve the first cryptographic key using the first VMID included in the first transaction request. Referring back to FIG. 3, the controller circuitry 304 may use the first VMID as an index to retrieve the first cryptographic key from the controller table 306. For example, as shown in FIG. 3, for VMID 402 equal to "1", "key 1" may be retrieved as the first cryptographic key.

In step 612, the apparatus 300 may encrypt the first data using the first cryptographic key associated with the first VM. Referring back to FIG. 3, the encryption circuitry 310 may use "key 1" to encrypt the first data to be written in the host memory 204. In some embodiments, based on the encryption flag 410 corresponding to the VMID 402, the first data to be written in the host memory 204 may not be encrypted. In some embodiments, based on the address scrambling flag 408 corresponding to the VMID 402, the address corresponding to the data can be scrambled.

In step 614, the apparatus 300 may send the encrypted first data to be written into the memory for the first transaction request. Referring back to FIG. 3, the memory interface 314 may send the encrypted first data to be written into the VM memory 204a for the first transaction request initiated by the first VM 214a.

In step 616, the first VM may initiate a second transaction to read the first data from the memory. For example, the first VM 214a may initiate the second transaction at a later point in time after the step 614 has been performed. The second transaction request may include an address to read the first data from, and the VMID for the first VM. For example, the address may correspond to the physical address space 204b corresponding to the VM memory 204a allocated to the first VM 214a. The VMID 402 for the first VM 214a may be equal to "1."

In step 618, the apparatus 300 may retrieve the first cryptographic key using the first VMID included in the second transaction request. Referring back to FIG. 3, the controller circuitry 304 may use the first VMID as an index to retrieve the first cryptographic key from the controller table 306. For example, as shown in FIG. 3, for VMID 402 equal to "1", "key 1" may be retrieved as the first cryptographic key.

In step 620, the apparatus 300 may read the encrypted first data from the host memory 204. For example, the encrypted first data may be read from a location in the host memory 204 corresponding to the address provided in the second transaction request. In some embodiments, based on the address scrambling flag 408, the address to read the encrypted first data from may be scrambled by the address scrambling circuitry 312.

In step 622, the apparatus 300 may decrypt the encrypted first data to generate the first data using the first cryptographic key. As discussed with reference to FIG. 4, the encryption flag 410 corresponding to the VMID 402 equal to "1" indicates "yes". Therefore, the data read from the host memory 204 may include encrypted first data. Referring back to FIG. 3, the decryption circuitry 316 may decrypt the encrypted first data using "key 1" for the first VM 214a.

In step 624, the apparatus 300 may send the first data to the host device 202. For example, the first data decrypted by the decryption circuitry 316 may be sent to the host device 202 via the host interface 302, which can be consumed by the first VM 214a.

FIG. 6B describes a second flow diagram for communication between the host device 202 and the apparatus 300, according to some embodiments. The second flow diagram may be a continuation of the first flow diagram in FIG. 6A.

In step 626, the hypervisor 212 may initiate a second VM and allocate same memory to the second VM which was previously allocated to the first VM. For example, in one instance, the second VM may be initiated after the first VM had finished executing, had been terminated, or had been migrated. In one instance, the step 626 may be executed after the step 624 has been executed. Referring back to FIG. 2, the hypervisor 212 may initiate the second VM 214b and allocate the VM memory 204a, which was previously used by the first VM 214a, to the second VM 214b. Note that the VM memory 204a may still store the encrypted first data associated with the first VM 214a, e.g., the first data encrypted using the first cryptographic key (e.g., key 1). The embodiments can allow reuse of the VM memory 204a without initializing the VM memory 204a to overwrite the encrypted data associated with the first VM 214a.

In step 628, the hypervisor 212 may send a second VIVID associated with the second VM to the memory controller 216. For example, the hypervisor 212 may send the VMID 402 equal to "2" associated with the second VM 214b to the apparatus 300. Referring back to FIG. 3, the host interface 302 may receive the VMID associated with the second VM 214b.

In step 630, the apparatus 300 may generate a second cryptographic key and store it in the table using the second VMID. As discussed with reference to FIG. 3, the cryptographic key generator 308 may generate the second cryptographic key for the second VM 214b. The second cryptographic key may be different than the first cryptographic key. Based on the key configuration 404 equal to "derived" in the controller table 306, the cryptographic key generator 308 may generate the second cryptographic key using a remote key and a random number generator and store it as "key 2" corresponding to the VMID 402 equal to "2".

In step 632, the second VM 214b may initiate a third transaction to read the first data from the memory. The third transaction request may include an address from the physical address space 204b corresponding to the VM memory 204a that was previously used by the first VM 214a to write the encrypted first data in the step 614.

In step 634, the apparatus 300 may retrieve the second cryptographic key using the second VMID included in the third transaction request. Referring back to FIG. 3, the controller circuitry 304 may use the second VMID as an index to retrieve the second cryptographic key from the controller table 306. For example, as shown in FIG. 3, for VMID 402 equal to "2", "key 2" may be retrieved as the second cryptographic key.

In step 636, the apparatus 300 may read the encrypted first data from the host memory 204. For example, the encrypted first data may be read from a location in the host memory 204 corresponding to the address provided in the third transaction request. In some embodiments, based on the address scrambling flag 408, the address to read the encrypted first data from may be scrambled by the address scrambling circuitry 312.

In step 638, the apparatus 300 may decrypt the encrypted first data using the second cryptographic key to generate second data. The second data may be different than the first data, and may include gibberish or garbage data. Referring back to FIG. 3, the decryption circuitry 316 may decrypt the data read from the memory using "key 2" for the second VM 214b. However, since "key 2" is different than the "key 1" used for encrypting the first data, the decryption circuitry 316 may not be able to correctly decipher the encrypted first data and may generate gibberish data. Thus, the second VM 214b may not have visibility to the first data associated with the first VM 214a. The second data (i.e., bad data) provided by the decryption circuitry 316 may be sent to the host device 202.

In step 640, the second VM 214b may initiate a fourth transaction to write third data to the memory. The fourth transaction request may include the third data, an address from the physical address space 204b corresponding to the VM memory 204a that was previously used by the first VM 214a to write the encrypted first data in the step 614.

In step 642, the apparatus 300 may retrieve the second cryptographic key using the second VMID included in the fourth transaction request. Referring back to FIG. 3, the controller circuitry 304 may use the second VMID as an index to retrieve the second cryptographic key from the controller table 306. For example, as shown in FIG. 3, for VMID 402 equal to "2", "key 2" may be retrieved as the second cryptographic key.

In step 644, the apparatus 300 may encrypt the third data using the second cryptographic key associated with the second VM. Referring back to FIG. 3, the encryption circuitry 310 may use "key 2" to encrypt the third data for the fourth transaction request. In some embodiments, based on the address scrambling flag 408 corresponding to the VMID 402, the address corresponding to the data can be scrambled.

In step 646, the apparatus 300 may send the encrypted third data to the memory without sanitizing the memory to overwrite the encrypted first data stored in the memory for the first VM. Referring back to FIG. 3, the memory interface 314 may send the encrypted third data to be written into the VM memory 204a for the fourth transaction request. Thus, the data for the second VM 214b may be written into the VM memory 204a without sanitizing the VM memory 204a to obscure the previously written data by another VM, e.g., the first VM 214a. This can eliminate the extra write cycles associated with sanitization of the VM memory 204a in between VM usages.

Figure 7:
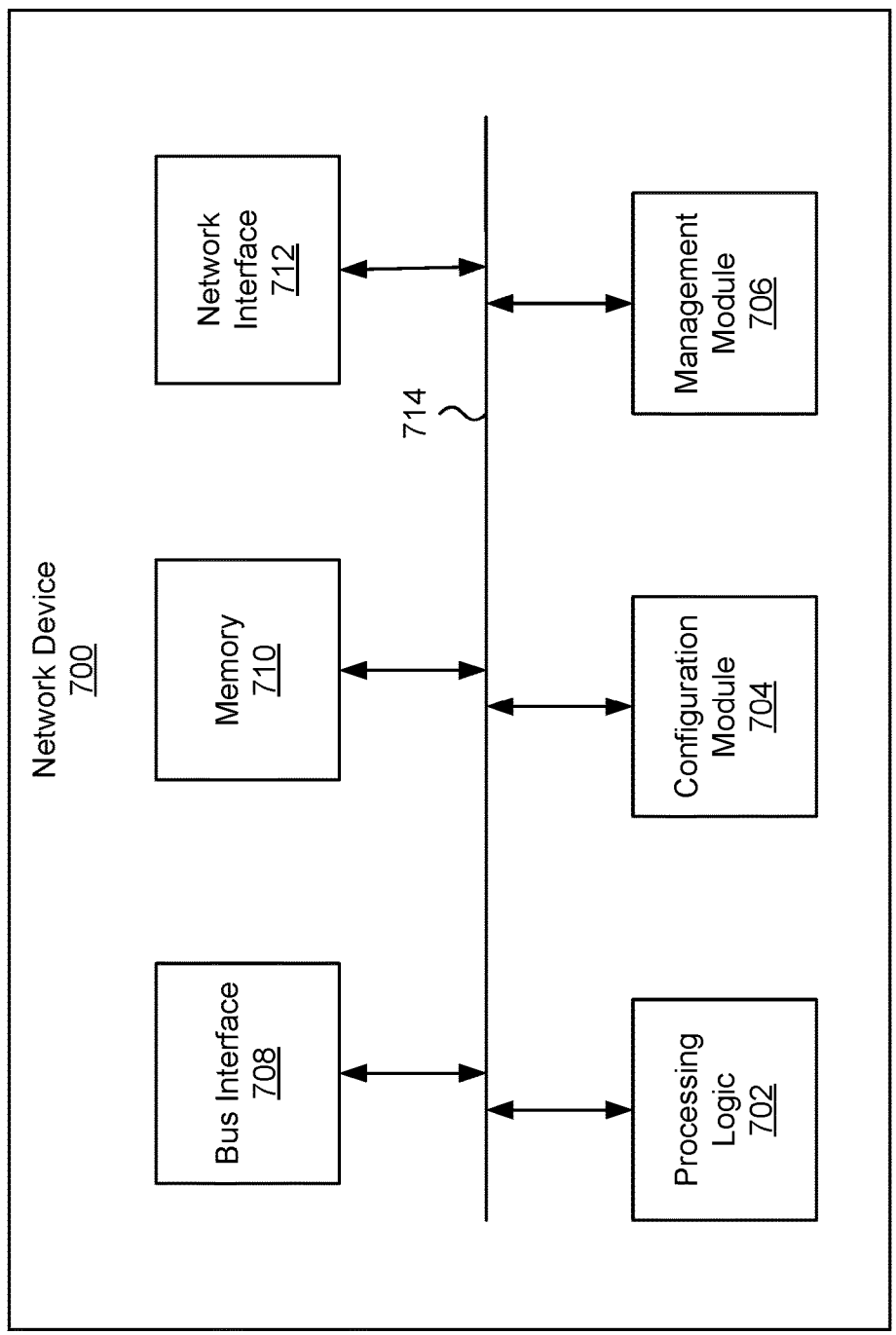
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. In some embodiments, the network device 700 may include functionality and/or components of the apparatus discussed with reference to FIG. 2 or FIG. 3. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700. In some embodiments, the memory 710 may communicate with a memory controller which includes the apparatus 300 or implements the functionality of the apparatus 300, as discussed with reference to FIG. 3.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
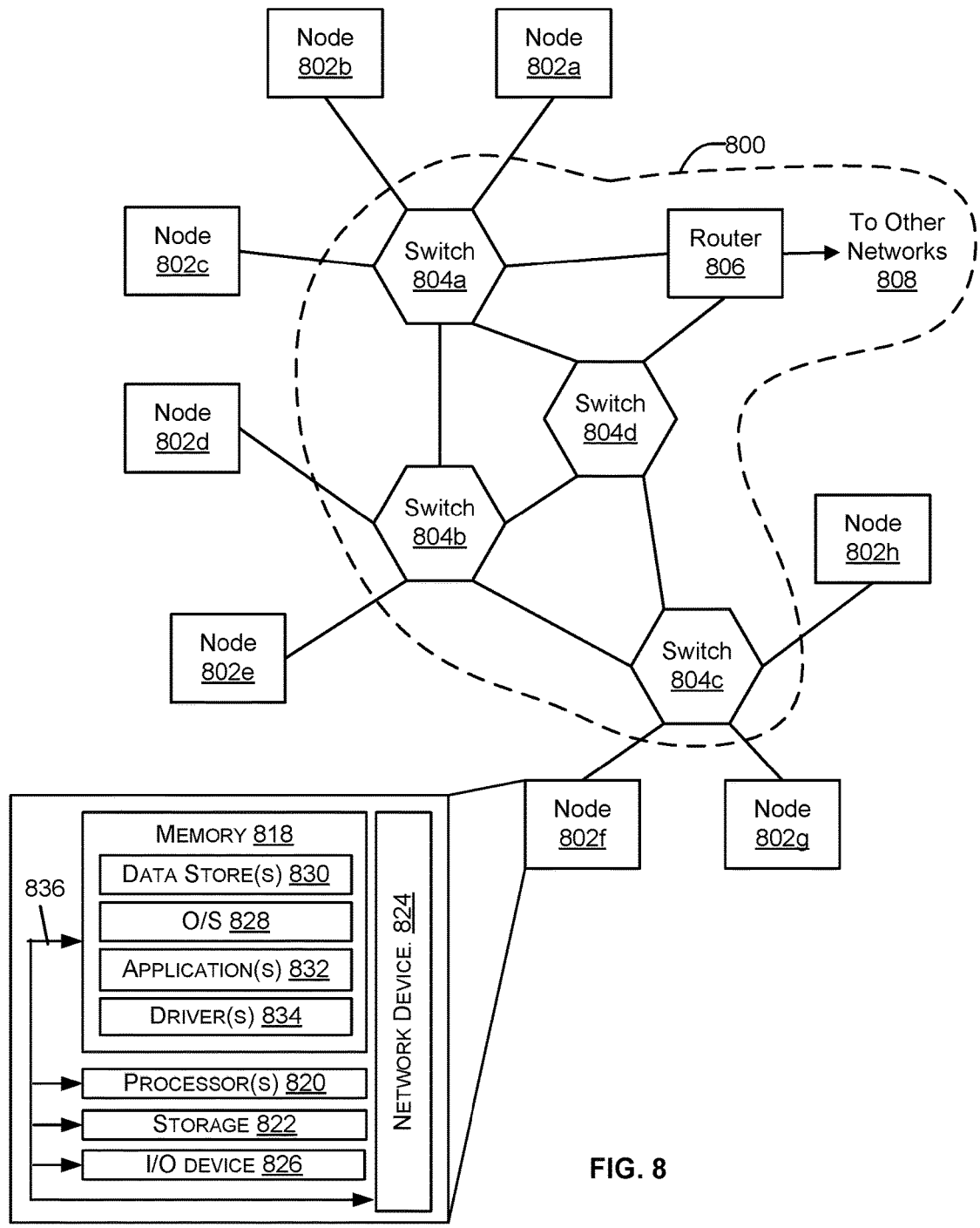
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein. In some embodiments, the memory 818 may communicate with a memory controller which includes the apparatus 300 or implements the functionality of the apparatus 300, as discussed with reference to FIG. 3.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A host device comprising:
   a processor configured to execute instructions stored in memory, the instructions associated with a hypervisor that upon execution cause the processor to:
   initiate a first virtual machine (VM) to be executed on the host device; and
   allocate a portion of a storage class memory to the first VM, the storage class memory communicatively coupled to the host device, wherein the portion of the storage class memory to be allocated to the first VM was previously allocated to a second VM, and wherein the portion of the storage class memory is allocated to the first VM without overwriting data for the second VM stored in the portion of the storage class memory; and a memory controller configured to:
receive a transaction request to write to the portion of the storage class memory, wherein the transaction request is initiated by the first VM, and wherein the transaction request includes first data and an address for the first data, wherein the address corresponds to a physical address in the portion of the storage class memory, and wherein the physical address is in the portion of the storage class memory that was also previously used by the second VM;
encrypt the first data using a first cryptographic key specific to the first VM; and
send encrypted first data to the portion of the storage class memory for writing to the physical address, wherein no sanitization of the portion of the storage class memory is performed before writing the encrypted first data to the portion of the storage class memory.

2. The host device of claim 1, wherein after allocating the portion of the storage class memory to the first VM, the instructions further cause the processor to:
send a first virtual machine identifier (VMID) associated with the first VM to the memory controller;
and wherein the memory controller is further configured to:
receive the first VMID associated with the first VM;
generate the first cryptographic key using a random number generator; and
store the first cryptographic key in a table using the first VMID as an index.

3. The host device of claim 1, wherein the transaction request further includes a first virtual machine identifier (VMID), and prior to encrypting the first data, the memory controller is further configured to:
retrieve the first cryptographic key from a table using the first VMID as an index.

4. The host device of claim 1, wherein the data stored in the portion of the storage class memory associated with the second VM is encrypted second data, and wherein the encrypted second data was encrypted using a second cryptographic key specific to the second VM, and wherein the second cryptographic key is different than the first cryptographic key.

5. An apparatus, comprising:
a host interface configured to receive transaction requests to write to memory communicatively coupled to the apparatus, wherein the transaction requests are initiated by virtual machines (VMs) executing on a device, wherein each transaction request includes respective data and a respective address for the respective data wherein the transaction requests include a first transaction request initiated by a first VM of the VMs, the first transaction request including first data and a first address;
encryption circuitry configured to encrypt the respective data using a cryptographic key for each respective VM from the VMs, wherein the cryptographic key for each respective VM is unique to the respective VM, and wherein the encryption circuitry encrypts the first data using a first cryptographic key specific to the first VM; and
a memory interface configured to communicate with the memory to write encrypted respective data to the memory at a respective location of the memory, the respective location having a respective physical address corresponding to the respective address, wherein the memory interface writes encrypted first data to a particular location, the particular location having a particular physical address corresponding to the first address, the particular location storing data for a VM other than the first VM, wherein the particular physical address and the particular location were also previously used by the VM other than the first VM, and wherein no sanitization of the particular location is performed before writing the encrypted first data to the particular location.

6. The apparatus of claim 5, wherein the host interface is further configured to receive a virtual machine identifier (VMID) for the respective VM from a hypervisor executing on the device, the apparatus further comprising:
a cryptographic key generator configured to generate the cryptographic key for each respective VM; and
a controller table configured to store the cryptographic key for each respective VM using a respective VMID.

7. The apparatus of claim 6, wherein the hypervisor provides the VMID for the respective VM to the host interface upon initiation of the VM.

8. The apparatus of claim 6, wherein each transaction request further includes the respective VMID, and wherein the respective VMID is used as an index to the controller table to retrieve the cryptographic key for the respective VM.

9. The apparatus of claim 6, wherein the cryptographic key is generated using a random number generator.

10. The apparatus of claim 6, wherein the cryptographic key is generated using a randomly generated key in combination with a remote key, wherein the device receives the remote key from a remote device communicatively coupled to the device via a network.

11. The apparatus of claim 10, wherein the remote key is associated with a remote server, a client, or a computer platform.

12. The apparatus of claim 6, further comprising:
decryption circuitry configured to decrypt the data using the cryptographic key for each respective VM, wherein the cryptographic key for each of the respective VM is retrieved from the controller table using the respective VMID.

13. The apparatus of claim 5, the apparatus further comprising:
an address scrambling circuit configured to modify the respective address using a scrambling function for the respective VM, and wherein the modified respective address is used as the respective physical address.

14. The apparatus of claim 13, wherein modifying the respective address using the scrambling function includes using a one-to-one mapping, wherein the one-to-one mapping is between the respective physical address used for addressing the memory and a corresponding modified address, wherein the respective physical address used and the corresponding modified address are within a page of the respective VM.

15. The apparatus of claim 5, wherein the device includes a processor and the cryptographic key for each respective VM is not accessible by the processor.

16. The apparatus of claim 5, wherein the apparatus is part of a memory controller on the device.

17. A method implemented by a memory controller comprising:
receiving a transaction request to write to memory communicatively coupled to the memory controller, wherein the transaction request is initiated by a virtual machine (VM) from a plurality of VMs executing on a host device communicatively coupled to the memory, and wherein the transaction request includes data, an address for the data, and a virtual machine identifier (VMID) for the VM;

retrieving, using the VMID, a cryptographic key associated with the VM, wherein the memory controller retrieves the cryptographic key from a table in the memory controller, wherein the cryptographic key for each respective VM from the plurality of VMs is unique to the respective VM;

encrypting the data using the cryptographic key; and sending encrypted data to the memory for writing at a location of the memory, the location having a physical address corresponding to the address, the location storing data for a VM other than the VM, wherein the physical address and the location were also previously used by the VM other than the VM, and wherein no sanitization of the location is performed before writing the encrypted data to the location.

18. The method of claim 17, further comprising:

receiving a second transaction request to write to the memory, the second transaction request initiated by a second VM from the plurality of VMs, wherein the second transaction request includes second data, a second address for the second data, and a second VMID for the second VM, wherein the address and the second address both correspond to the physical address;

retrieving using the second VMID, a second cryptographic key associated with the second VM from the table, wherein the second cryptographic key is different than the cryptographic key associated with the VM;

encrypting the second data using the second cryptographic key; and sending second encrypted data to the memory for writing at a location corresponding to the second address without previously overwriting the encrypted data stored in the memory for the VM.

19. The method of claim 17, comprising:

receiving a second transaction request to read from the memory, the second transaction request initiated by a second VM from the plurality of VMs, wherein the second transaction request includes a second address and a second VMID for the second VM, wherein the address and the second address both correspond to the physical address;

retrieving using the second VMID, a second cryptographic key associated with the second VM from the table;

reading, from the memory, the encrypted data from the location corresponding to the second address;

decrypting using the second cryptographic key, the encrypted data to generate second data, wherein the second data is not same as the data included in the transaction request to write to the memory; and sending the second data to the host device.

20. The method of claim 17, the method further comprising:

receiving a second transaction request to read the data from the memory, the second transaction request initiated by the VM, wherein the second transaction request includes the address and the VMID;

retrieving using the VMID, the cryptographic key associated with the VM from the table;

reading the encrypted data from the location corresponding to the address from the memory;

decrypting using the cryptographic key, the encrypted data read from the memory; and sending decrypted data to the host device, wherein the decrypted data is same as the data included in the transaction request to write to the memory.

21. The method of claim 17, the method further comprising, prior to receiving the transaction request:

receiving the VMID for the VM from a hypervisor executing on the host device to generate the cryptographic key;

generating the cryptographic key using a random number generator; and storing the cryptographic key in the table using the VIVID as an index.

22. The method of claim 17, wherein the cryptographic key is only accessible by an encryption circuit of the memory controller.

* * * * *

UNITED STATES PATENT AND TRADEMARK OFFICE
CERTIFICATE OF CORRECTION

PATENT NO.         : 10,404,674 B1
APPLICATION NO.    : 15/445190
DATED              : September 3, 2019
INVENTOR(S)        : Nafea Bshara et al.

Page 1 of 1

It is certified that error appears in the above-identified patent and that said Letters Patent is hereby corrected as shown below:

In the Claims

Column 26, Line 40, Claim 12:
Delete: "decryption circuitry configured to decrypt the data using"
Insert: -- decryption circuitry configured to decrypt the respective data using --

Column 27, Line 40, Claim 19:
Delete: "The method of claim 17, comprising:"
Insert: -- The method of claim 17, further comprising: --

Column 28, Line 37, Claim 21:
Delete: "storing the cryptographic key in the table using the VIVID"
Insert: -- storing the cryptographic key in the table using the VMID --

Signed and Sealed this
Fifteenth Day of October, 2019

Andrei Iancu
*Director of the United States Patent and Trademark Office*